J. W. Smith.
Corn Harvester.

No. 47,995.      Patented May. 30, 1865.

John W. Smith
Inventor

Witnesses

UNITED STATES PATENT OFFICE.

JOHN W. SMITH, OF IOWA POINT, KANSAS.

IMPROVEMENT IN CORN-HARVESTERS.

Specification forming part of Letters Patent No. 47,995, dated May 30, 1865.

*To all whom it may concern:*

Be it known that I, JOHN W. SMITH, of Iowa Point, Doniphan county, in the State of Kansas, have invented a certain new and Improved Machine for Cutting and Shocking or Stacking Corn; and I do hereby declare the following to be a full, clear, and exact description of the same, reference being had to the annexed drawings, making part of this specification, in which—

Figure 1:
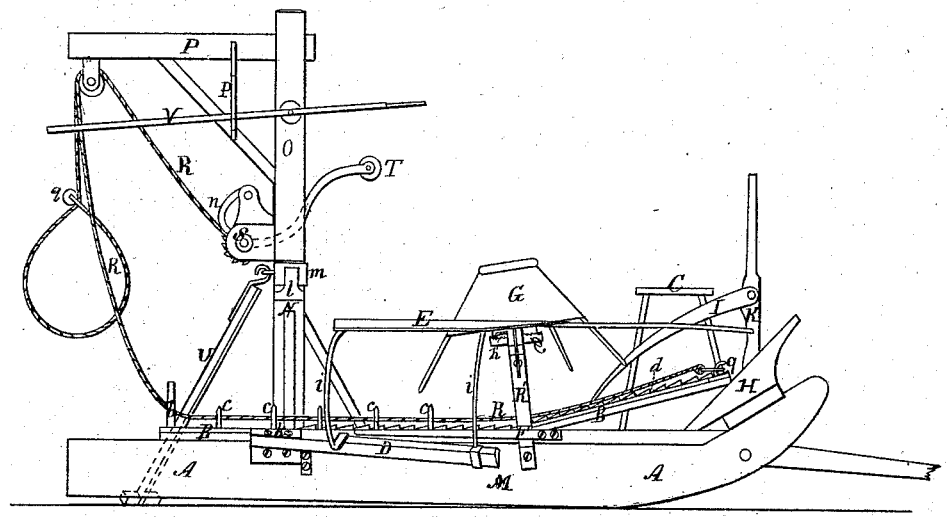
Figure 3:
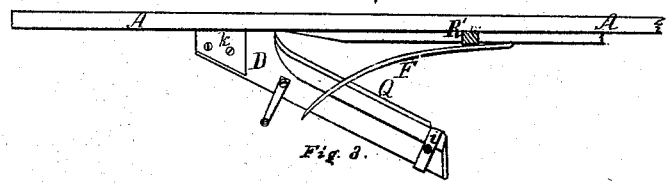
Figure 2:
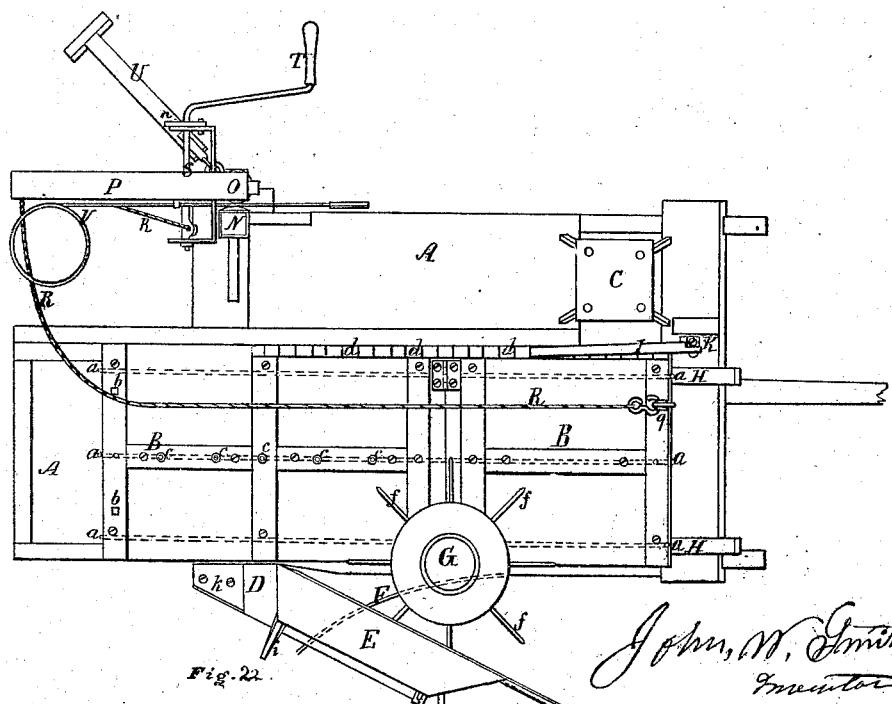

Figure 1 is a side elevation, Fig. 2 a top view, and Fig. 3 a detached part, of the machine hereinafter referred to.

The object of my invention is to supply farmers with a more efficient machine for cutting and stacking corn, which object I propose to accomplish by providing a machine fabricated in the following manner—that is to say:

I first make a pair of sled-runners (represented in the drawings by A A) the bottoms of which are curved along their entire length, as will appear by the line representing the plane surface under the machine in Fig. 1. These runners I unite upon parallel planes by means of transverse beams after the manner of an ordinary sled, and against the inside of each runner I arrange a wheel, (shown in dotted lines by M, Fig. 1.) The peripheries of these wheels project a little below the bottom surface of the runners, so as to partially take the weight of the machine and relieve the team of a part of the drag, the power to draw the machine being applied the same as in the case of an ordinary sled. The sled being thus constructed, I apply to the right-hand runner a knife frame or block, D, to which I secure the knife Q in the manner shown in Fig. 3. Diagonally across the knife I arrange a spring, F, and secure it to the sled-runner in the manner shown. The object of this spring is to press the stalks against the knife to insure an easy-sliding cut as the machine advances.

Upon the knife-block D, I erect a guide, E, and arrange it upon about the same plane with the knife, and so as to project in advance of it. This guide is to catch the leaning stalks and raise them up toward the sled. It consists of a bar partially covered by a plate the front end whereof is cut diagonally from the front backward, so as to raise the hanging ends of corn as the machine advances, thus leaving the stalks free to fall over on the sled. The said guide is supported upon a pair of standards, *i*

*i*, the bottoms of which are secured to the knife-block in the manner shown. Having thus completed the cutter and guide, I erect upon the same runner a column or stud, R', and upon the top of it I arrange a conic reel, the upper part of which I cover with a plate or cap, leaving the prongs composing the reel to project below in the manner shown by *f f*. The object of this reel is to catch the stalks as the machine advances and lay them straight across the platform, the cap being put on the upper end to keep the stalks and ears from entangling in the reel. The said reel is kept from turning back by means of a ratchet-wheel, *g*, and a pawl, *h*, as shown in the drawings, Fig. 1. The reel being thus completed, I arrange upon the sled a movable platform, (shown by B,) which travels upon metal slides, (shown in dotted lines *a a*.) This platform consists of two parts hinged together by *e*, and the front end is moved by the driver up and down an inclined plane, H, fixed upon a plank secured across the nose of the sled-runners. The said platform is moved back by means of a lever, K, and a pawl, I, which act upon a rack, *d*, fixed on the side of the platform.

The driver's seat is located at *c*, so as to bring the driver within convenient reach of the lever.

When the machine is first put into operation, the platform is moved forward, drawing the front end up the inclined plane, as before stated, and as fast as the falling corn fills up the back end of the platform it is moved back by the driver until enough is obtained to form a stack, the runners being made long enough to form a support for the platform as it is moved back in the manner shown in the drawings. In the rear end of the platform there are two pins placed to keep the stalks from falling off, and in the center a row of pins is placed to hold the stalks and carry them back with the platform.

Having thus completed the machine for cutting, disposing, and carrying the stalks, I erect on the outside of the left-hand runner, near the rear end thereof, a derrick or crane to lift the corn off the machine and set it up in stacks. The shaft of this derrick is shown by O and the arm by P. The shaft is supported by a frame-work, N, made on the rear end of the machine. The lower end thereof, being made cylindrical, is slipped through a socket, *m*, and secured to the upper part of said frame-work, and pivots into a suitable step secured to the runner. The barrel or reel of the derrick is represented by S, the handle by T, and a movable brace, U, is hooked into a ring on the socket $m$ to support the derrick when swinging a stack of corn off the machine. The reel is fitted with a ratchet-wheel and pawl, $n$, in the usual manner, to keep it in the desired position. The end of the derrick-rope R is fitted with a hook, which is provided with a small roller, and when the machine is in operation this roller is hooked over a bent pin or staple, and the rope is laid along the whole length of the platform. Now, as soon as sufficient corn has been cut to form a shock the hook is cast off the pin $p$ and hooked over the rope, so as to form a loop, (as shown in red,) which, by the application of power to the crank T, is drawn tight around the stack, which is also lifted up off the platform and deposited in the desired place upon the ground. As soon as the shock has been deposited upon the ground the ring V on the end of the lever is brought down over the top of the stack, thus holding it together while the attendant puts a band around it; but this lever and ring is of use only when the operator desires to tie his stacks. When this is not desired this lever is an unnecessary attachment.

Having now described my invention, what I claim as new, and desire to secure by Letters Patent, is—

1. In combination with the sled-runners, the movable platform B, operated substantially in the manner described.

2. Making said platform in two parts, with front end hinged to the main body of the platform and arranged to move up or down the inclined plane H, in the manner shown and described.

3. The reel G, constructed substantially as described, and revolved by the pressure of the stalks upon its arms, when used in connection with the guides, for the purpose specified.

JOHN W. SMITH.

Witnesses:
ED. BARTLETT,
F. S. VANDERPOOL.